UNITED STATES PATENT OFFICE.

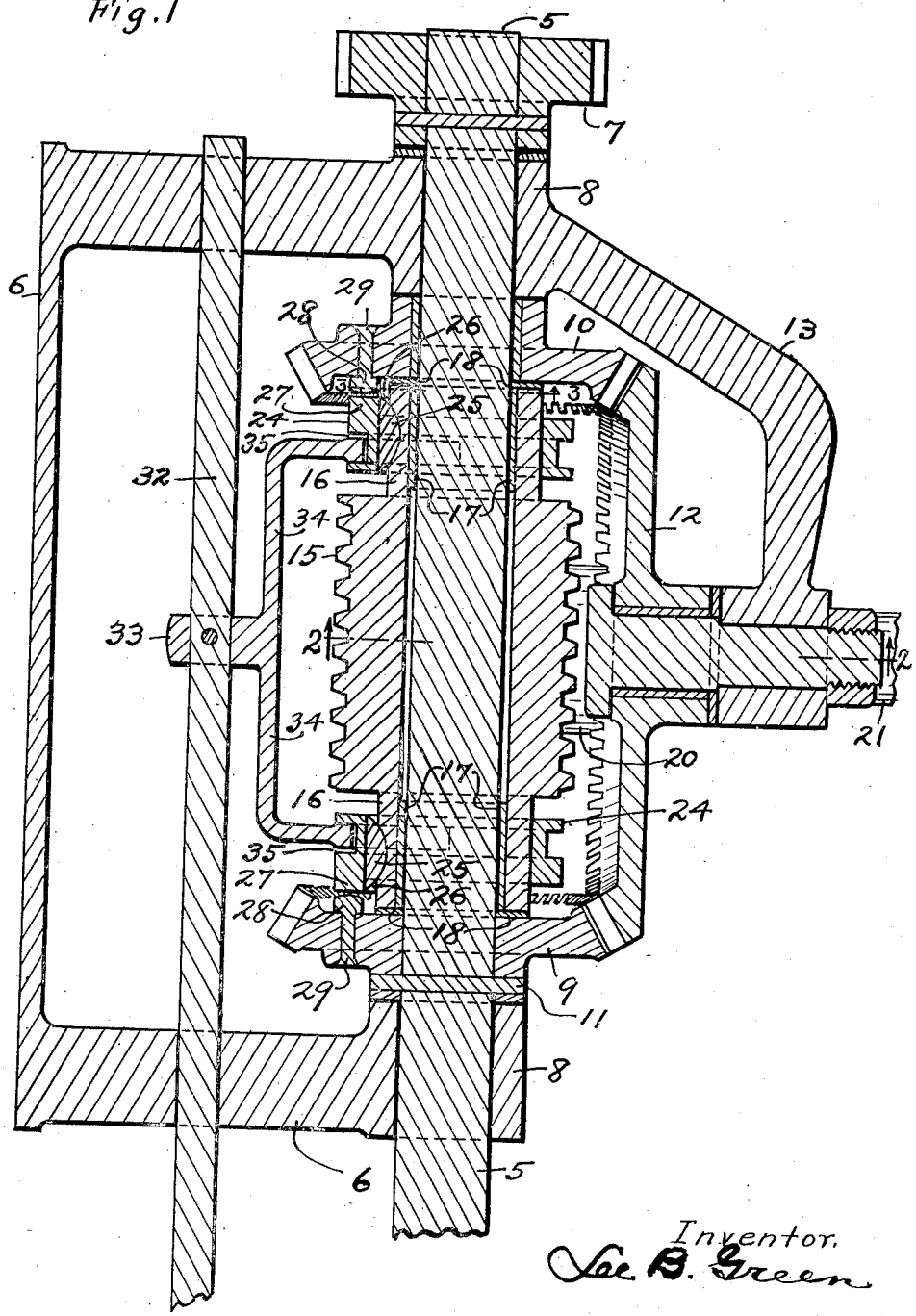

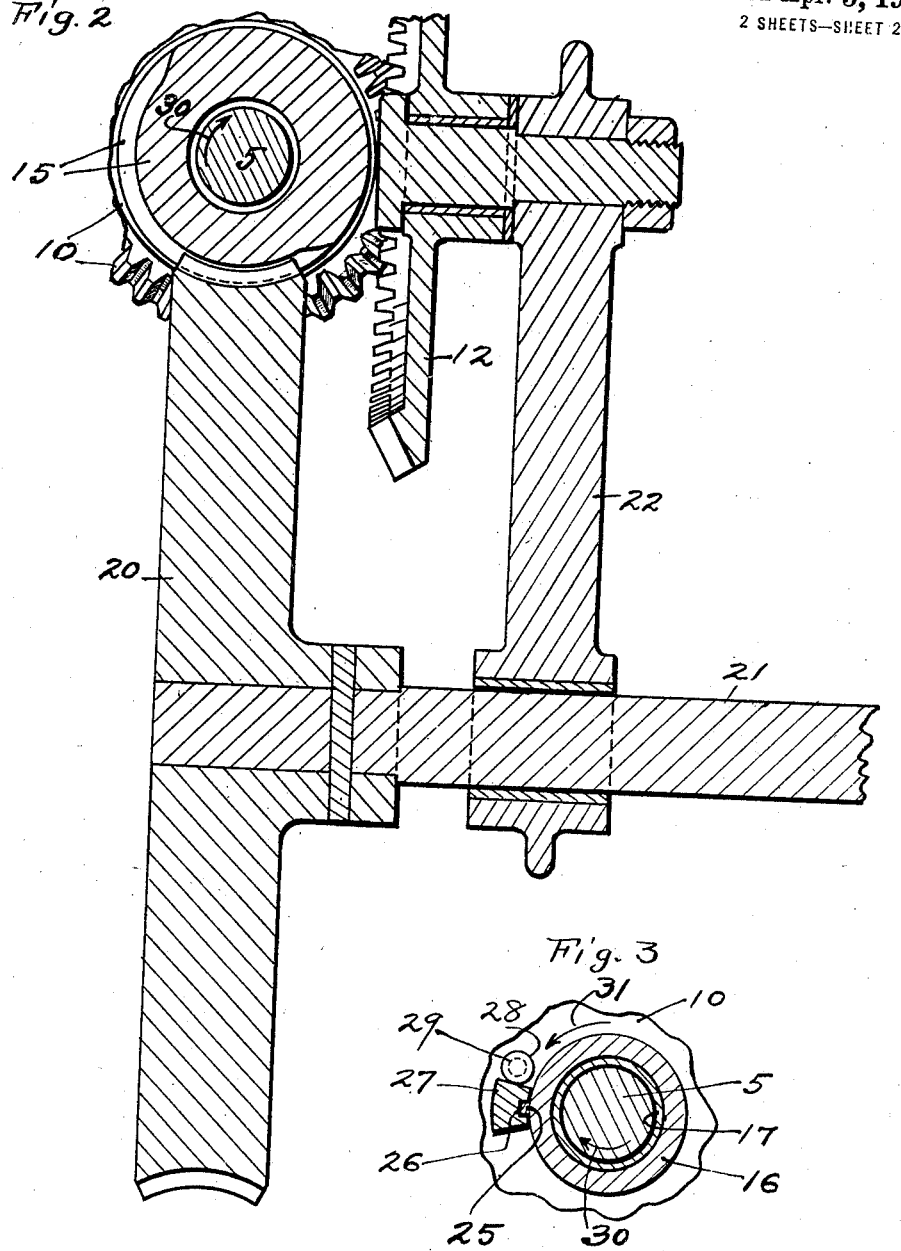

LEE B. GREEN, OF CLEVELAND, OHIO, ASSIGNOR TO THE FEDERAL MACHINE PRODUCTS COMPANY, OF CLEVELAND, OHIO, A CORPORATION OF OHIO.

POWER-TRANSMITTING MECHANISM.

1,373,556.  Specification of Letters Patent.  Patented Apr. 5, 1921.

Application filed January 31, 1920. Serial No. 355,518.

*To all whom it may concern:*

Be it known that I, LEE B. GREEN, a citizen of the United States, residing at Cleveland, in the county of Cuyahoga and State of Ohio, have invented a new and useful Power-Transmitting Mechanism, of which the following is a specification.

This invention relates to improvements in power-transmitting mechanism, and pertains more especially to power-transmitting mechanism comprising a shaft adapted to be rotated continuously in one direction and means whereby motion may be transmitted from said shaft to a rotary member which is to be intermittently rotated a limited and definite extent in opposite directions.

The primary object of this invention is to provide improved power-transmitting mechanism of the character indicated which is simple and durable in construction, which has its component members compactly arranged, and which is reliable in its operation.

With this object in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a horizontal section of power-transmitting mechanism embodying my invention. Fig. 2 is a vertical section taken along the line 2—2, Fig. 1. Fig. 3 is a section taken along the line 3—3, Fig. 1, except that in Fig. 3 the two illustrated members of a clutch are shown in an operative relation, whereas in Fig. 1 said clutch-members are shown in an inoperative relation. Portions are broken away in the drawings to reduce their size.

Referring to said drawings, 5 indicates a shaft which is shown arranged horizontally and supported from framework 6 of a machine or apparatus comprising my improved power-transmitting mechanism. Said shaft is operatively provided at one end with a driving spur-gear 7 to which power is applied in any approved manner and which is rotated continuously in one direction. Said shaft is therefore adapted to be rotated continuously in one direction. The illustrated framework 6 has two bearings 8 for said shaft, and said bearings are spaced longitudinally of the shaft. Between said bearings are two bevel-gears 9 and 10 which are mounted on and spaced longitudinally of the shaft 5 and oppositely arranged and face each other. The gear 9 is fixed to said shaft by a pin 11 and therefore operatively connected with the shaft. The gear 10 is loose on said shaft. At one side and spaced from the shaft 5 is an intermediate bevel-gear 12 which is in mesh with the gears 9 and 10 and therefore arranged to transmit motion from the gear 9 to the gear 10, and said intermediate gear is supported in any approved manner from a bracket 13 with which the framework 6 is provided.

Between the gears 9 and 10 is a worm 15 which is concentric and loose in relation to the shaft 5 and has two corresponding tubular end members 16 which are circular in cross-section and arranged at opposite ends respectively of the worm and in line endwise. The members 16 are of course arranged concentrically relatively to the axis of the worm and loosely mounted and have bearing on the shaft 5. The worm is therefore loosely mounted on the shaft 5 through the medium of its end members 16, and each of said end members of the worm is shown provided internally with an annular bushing 17 extending circumferentially of the shaft. It will be observed therefore that the gears 9 and 10 are arranged adjacent the outer end of the different end members 16 respectively of the worm, and preferably a metal washer 18 is loosely interposed between each of said gears and the adjacent end member of the worm and mounted on the shaft 5 and forms an end bearing for said member of the worm. The worm 15 is therefore not shiftable endwise of the shaft 5 but is in mesh with a worm-wheel 20 shown arranged below the worm and mounted on and operatively connected in any approved manner with a shaft 21 which is shown arranged horizontally and at a right angle to the shaft 5 and has bearing in an arm 22 projecting downwardly from the bracket 13 of the framework 6. The worm-wheel 20 and the connected shaft 21 are to be rotated intermittently and a definite extent in opposite directions, and obviously said worm-wheel and said shaft are rotated in the one direction or the other according as the worm 15 is rotated in the one or the other direction.

On each end member 16 of the worm is mounted a sleeve 24 which is shown operatively connected with said member of the worm by a spline 25 which is partially embedded in and fixed in relation to said member of the worm and projects into a keyway 26 formed in and extending from end to end of said sleeve so that the sleeve, although operatively connected with, is shiftable endwise of said member of the worm, and I would here remark that said sleeve is spaced in its mid position from the inner end of said member of the worm.

Means for establishing operative connection between each sleeve 24 and the adjacent gear of the hereinbefore mentioned oppositely arranged gears (see Fig. 1) are provided and comprise a clutch shown consisting of two members one of which is formed by a lug or projection 27 formed on and preferably integral with the sleeve and projecting toward said adjacent gear, and the other member of said clutch is formed by the head 28 of a pin 29 which is fixed to said gear in any approved manner and arranged with said head exposed at the face of the gear. In Fig. 1 the sleeves 24 are shown in their mid position in which the clutch-member 27 carried by each sleeve is out of operative relation with the associated clutch-member 28 carried by the gear arranged opposite the outer end face of said sleeve, whereas Fig. 3 shows said sleeve as having been shifted outwardly endwise into its outer position in which its clutch-member 27 projects into the path of said clutch-member 28 on said gear during the rotation of the gear. Obviously if the shaft 5 is rotated continuously in the direction indicated by the arrow 30, Figs. 2 and 3, the gear 10 shown in Fig. 3, being the gear which is loosely mounted on said shaft and adapted to be driven through the medium of the intermediate gear 12 from the gear 9 which is pinned to the shaft, is rotated in the direction indicated by the arrow 31 in Fig. 3 which therefore shows said gear as having been rotated in the direction required to bring its clutch-member 28 into operative contact with the clutch-member 27 on the adjacent sleeve, and hence in Fig. 3 said gear 10 is shown as operatively connected through the medium of said clutch-members with said sleeve and consequently with the worm.

Means for shifting the sleeves 24 simultaneously endwise of the end members 16 of the worm and consequently longitudinally in relation to the shaft 5, in the one or the other direction, are provided and shown (see Fig. 1) as comprising an endwise shiftable rod 32 which is arranged at one side of and spaced from the worm and parallel with said shaft and has bearing in the frame-work 6. To said rod the central portion or body 33 of a yoke is fixed in any approved manner, and said yoke has two arms 34 one of which extends to one of the sleeves 24 and the other of said arms extends to the other of said sleeves. Each arm 34 projects into an annular recess 35 with which the adjacent sleeve is externally provided. It will be observed therefore that both sleeves 24 are operatively connected with the rod 32 in such a manner that the two sleeves are simultaneously shifted endwise in the one or the other direction, according as said rod is shifted in the one direction or the other. In Fig. 1 said rod and the connected yoke are shown as holding said sleeves in their mid position, and it will be observed that the clutch-member 27 of the one or the other of said sleeves is brought into an operative relation to the associated clutch-member 28 according as the rod is shifted, in the mid position of the sleeves, in the one or the other direction. While the clutch-member 27 on one of the sleeves 24, during the simultaneous actuation of said sleeves endwise, moves into its operative position the clutch-member of the other of said sleeves is withdrawn farther from its operative position and remains inoperative, and that the spacing of the sleeves from the inner ends of the sleeve-carrying members 16 of the worm permits of the movement of one sleeve with the other sleeve during the shifting of the last-mentioned sleeve into its outer position as required to render its clutch-member operative. It will be observed therefore that the relative arrangement of the parts is such that the clutch-member of each sleeve is in its mid position in the mid position of the sleeve and out of the path of the associated clutch-member of the adjacent gear of the hereinbefore mentioned oppositely arranged gears, that the rod 32 is in its mid position in the mid position of the sleeves, that when said rod has been shifted endwise from its mid position the clutch-member supported through the medium of a sleeve 24 from one end member 16 of the worm has been shifted from its mid position into its outer and operative position and the clutch-member supported from the other end member of the worm has been shifted from its mid position into its inner position and is still inoperative, that the worm employed in intermittently transmitting motion from the shaft 5 is rotated in the direction in which said shaft is rotated or in the opposite direction according as the clutch-member carried by the one or the other end member of the worm is rendered operative, and that the rotation of the worm-wheel 20 and the connected shaft 21 during the operation of the worm is arrested as soon as the clutch-members supported from the worm have been shifted into their mid position, because the meshing of the rotating worm-wheel and worm will lock them against further rotation as soon as operative connection between the operating worm and the shaft 5 has been interrupted. I would also remark that as the gears 9 and 10 rotate continuously during the rotation of the shaft 5 the clutch-member 28 of each of said gears, although shown in Fig. 1 as directly opposite the associated clutch-member 27, obviously does not prevent the shifting, into its path and therefore into operative relation therewith, of said associated clutch-member.

What I claim is—

1. The combination, with a shaft, and a worm loose on said shaft and employable in transmitting motion from said shaft, of two bevel-gears which are mounted on said shaft adjacent opposite ends respectively of the worm and face each other and are the one operatively connected with and the other loose on the shaft, an intermediate bevel-gear meshing with the first-mentioned gears, and two clutches adjacent opposite ends respectively of the worm and each controlling operative connection between the worm and the adjacent gear of said first-mentioned gears, each clutch comprising a member carried by the adjacent gear of said first-mentioned gears and a member which is supported from the worm and shiftable independently of the worm longitudinally of the aforesaid shaft and in its mid position is out of operative relation to the associated clutch-member, the clutch-members carried by the worm being adapted to be in their mid position simultaneously and shiftable in either direction from said position, and the relative arrangement of the parts being such that only the one or the other of the last-mentioned clutch-members is rendered operative according as they are shifted from their mid position simultaneously in the one or the other direction longitudinally of the aforesaid shaft.

2. The combination, with a shaft, and a worm loose on said shaft, of two bevel-gears which are mounted on said shaft adjacent opposite ends respectively of the worm and face each other and are the one operatively connected with and the other loose on the shaft, an intermediate bevel-gear meshing with the first-mentioned gears, and two clutches adjacent opposite ends respectively of the worm and each controlling operative connection between the worm and the adjacent gear of said first-mentioned gears, each clutch comprising a member carried by the adjacent gear of said first-mentioned gears and a member which is supported from the worm and shiftable independently of the worm longitudinally of the aforesaid shaft and is inoperative in its mid position, the clutch-members carried by the worm being adapted to be in their mid position simultaneously and shiftable in either direction from said position, and means for shifting said last-mentioned clutch-members simultaneously, the relative arrangement of the parts being such that upon said shifting of said last-mentioned clutch-members only the one or the other of them has been rendered operative according as they are shifted simultaneously in the one or the other direction longitudinally of the aforesaid shaft.

3. The combination, with a shaft, and a worm loose on said shaft, of two bevel-gears which are mounted on said shaft adjacent opposite ends respectively of the worm and face each other and are the one operatively connected with and the other loose on the shaft, an intermediate bevel-gear meshing with the first-mentioned gears, two clutches adjacent opposite ends respectively of the worm and each controlling operative connection between the worm and the adjacent gear of said first-mentioned gears, each clutch comprising a member carried by the adjacent gear of said first-mentioned gears and a member which is supported from the worm and shiftable independently of the worm longitudinally of the aforesaid shaft and in its mid position is out of operative relation to the associated clutch-member, the clutch-members carried by the worm being adapted to be in their mid position simultaneously and shiftable in either direction from said position, and means for shifting said last-mentioned clutch-members simultaneously and comprising an endwise movable rod, the relative arrangement of the parts being such that only the one or the other of said last-mentioned clutch-members is rendered operative during the movement of said rod from its mid position in the one or the other direction.

4. The combination, with a shaft, a worm loose on said shaft and having two tubular end members which are arranged in line endwise at opposite ends respectively of the worm and have bearing on the shaft, two bevel-gears which are each provided with a clutch-member and mounted on said shaft adjacent the different end members respectively of the worm and face each other and are the one operatively connected with and the other loose on said shaft, and an intermediate bevel-gear meshing with the first-mentioned gears, two sleeves on and operatively connected with and shiftable endwise of the different end members respectively of the worm and arranged to be in their mid position simultaneously, and means for shifting said sleeves simultaneously, each sleeve being spaced in its mid position from the inner end of the adjacent sleeve-supporting member and having a clutch-member associated with the clutch-member carried by the adjacent gear of the first-mentioned gears, and the relative arrangement of the parts being such that the clutch-members of the sleeves are inoperative in the mid position of the sleeves and that only the clutch-member of the one or the other of the sleeves is in an operative position in relation to the associated clutch-member according as the sleeves have been shifted longitudinally of the aforesaid shaft from their mid position in the one or the other direction.

5. The combination, with a shaft, a worm loose on said shaft and having two tubular end members which are arranged in line endwise at opposite ends respectively of the worm and have bearing on the shaft, two bevel-gears which are each provided with a clutch-member and mounted on said shaft adjacent the different end members respectively of the worm and face each other and are the one operatively connected with and the other loose on the shaft, an intermediate bevel-gear meshing with the first-mentioned gears, two sleeves mounted on and operatively connected with and shiftable endwise of the different end members respectively of the worm and arranged to be in their mid position simultaneously, and means for shifting said sleeves simultaneously and comprising a movable rod, each sleeve having a clutch-member associated with the clutch-member carried by the adjacent gear of the first-mentioned gears, and the relative arrangement of the parts being such that the clutch-members of the sleeves are inoperative in the mid position of the sleeves and that only the clutch-member of the one or the other of the sleeves is rendered operative in relation to the associated clutch-member according as said rod in the mid position of the sleeves is shifted in the one or the other direction.

6. The combination, with a shaft, a worm-wheel supported independently of and employable in transmitting motion from said shaft, and a worm loose on said shaft, of two bevel-gears which are mounted on said shaft adjacent opposite ends respectively of the worm and face each other and are the one operatively connected with and the other loose on the shaft, an intermediate bevel-gear meshing with the first-mentioned gears, and two clutches adjacent opposite ends respectively of the worm and each controlling operative connection between the worm and the adjacent gear of said first-mentioned gears, each clutch comprising a member carried by the adjacent gear of said first-mentioned gears and a member which is supported from the worm and shiftable independently of the worm longitudinally of the aforesaid shaft and inoperative in its mid position, the clutch-members carried by the worm being adapted to be in their mid position simultaneously and shiftable in either direction from said position, and the relative arrangement of the parts being such that only the one or the other of the last-mentioned clutch-members is rendered operative according as they are shifted from their mid position simultaneously in the one or the other direction longitudinally of the aforesaid shaft.

In testimony whereof, I sign the foregoing specification, in the presence of two witnesses.

LEE B. GREEN.

Witnesses:
CASPER J. DOVER,
L. B. IGLAUER.